United States Patent [19]
Salisbury

[11] Patent Number: 5,495,913
[45] Date of Patent: Mar. 5, 1996

[54] MOTOR VEHICLE AND SUSPENSION LINKAGE

[76] Inventor: Frederick R. Salisbury, 8 Simpson Ave., Pitman, N.J. 08071

[21] Appl. No.: 335,682

[22] Filed: Nov. 8, 1994

[51] Int. Cl.⁶ .................................................. B62K 11/00
[52] U.S. Cl. .............................................................. 180/227
[58] Field of Search ........................... 180/219, 223, 180/227; 280/284, 724, 725

[56] References Cited

U.S. PATENT DOCUMENTS

| | | | |
|---|---|---|---|
| 3,948,543 | 4/1976 | MacDonald et al. | 280/284 |
| 4,076,271 | 2/1978 | Doncque | 280/284 |
| 4,347,909 | 9/1982 | Takemura et al. | 180/219 |
| 4,418,800 | 12/1983 | Hess | 188/195 |
| 4,463,964 | 8/1984 | Takayagi et al. | 280/284 |
| 4,556,119 | 12/1985 | Shiratsuchi | 180/227 X |
| 4,653,604 | 3/1987 | De Cortanze | 180/227 |
| 4,727,952 | 3/1988 | Morioka et al. | 180/219 |
| 4,781,264 | 11/1988 | Matsuzaki et al. | 180/219 |
| 4,805,717 | 2/1989 | Trema | 180/219 |
| 4,828,069 | 5/1989 | Hatsuyama | 180/219 |
| 5,014,808 | 5/1991 | Savard et al. | 180/219 |
| 5,279,383 | 1/1994 | Gustafsson | 180/227 |

*Primary Examiner*—Margaret A. Focarino
*Assistant Examiner*—F. Zeender
*Attorney, Agent, or Firm*—Thomas A. Lennox

[57] ABSTRACT

A shock absorbing linkage apparatus is provided on a motor vehicle such as a motorcycle including a U-shaped member with the free ends connected to the axle and the base section connected to the frame. An integral linkage member pivotally connects to the front of the swingarm member extending downwardly to connect with the shock absorber. Two rearward connection points on the integral member are connected to anchor arm members which connect to upper connection points on the frame. The shock absorber is positioned horiztonally extending rearwardly from a lower connection to the frame.

22 Claims, 3 Drawing Sheets

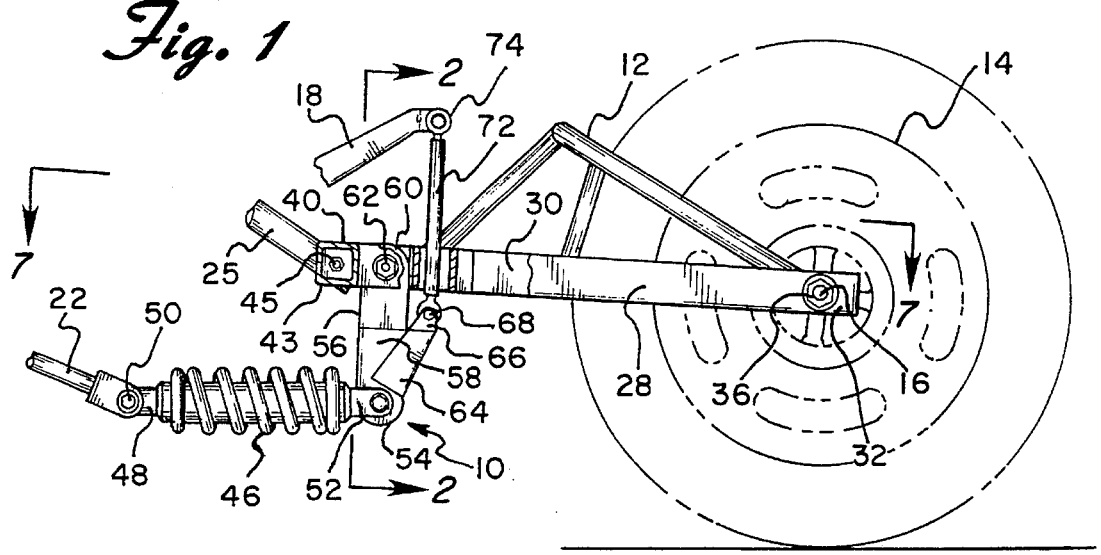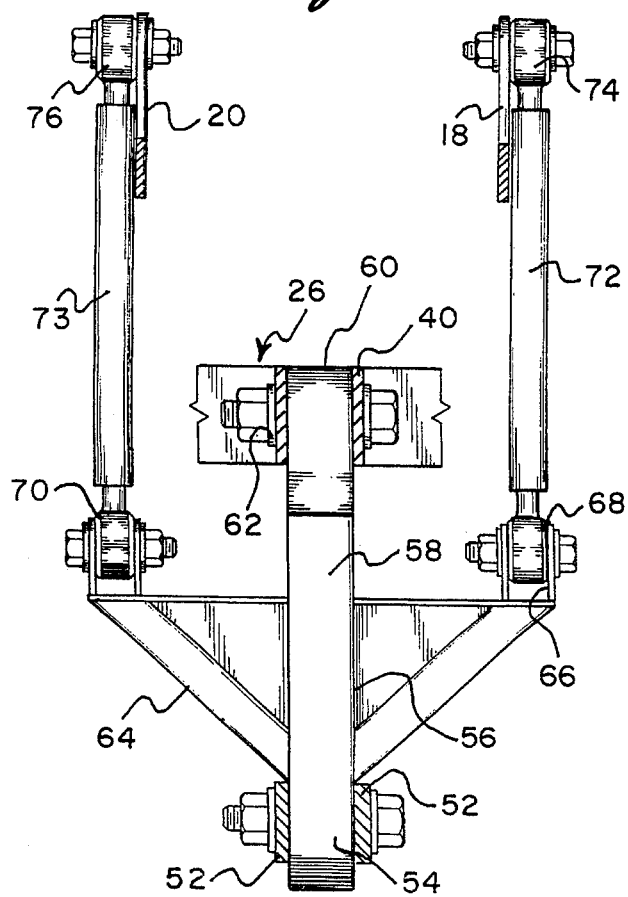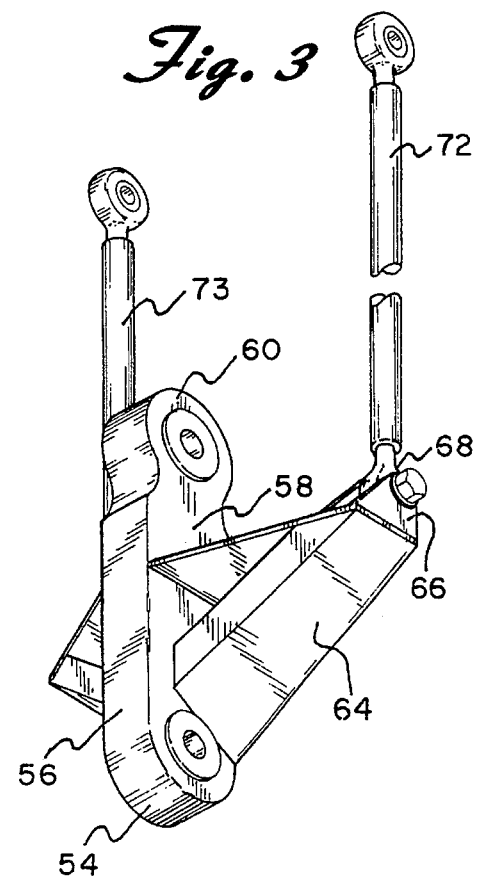

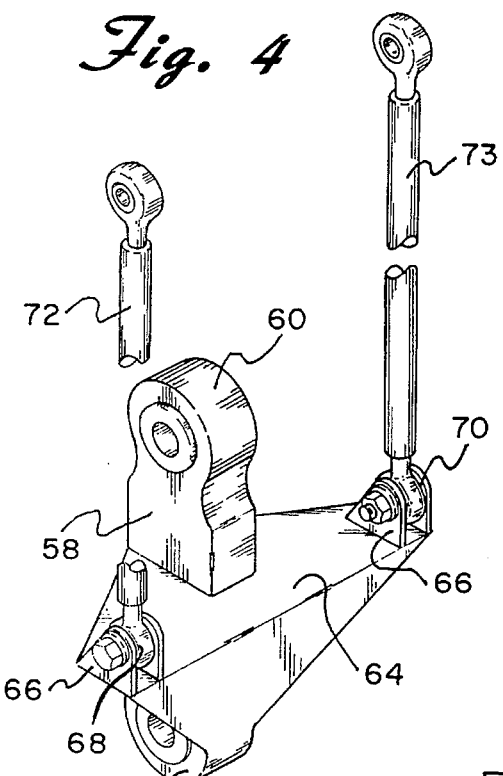
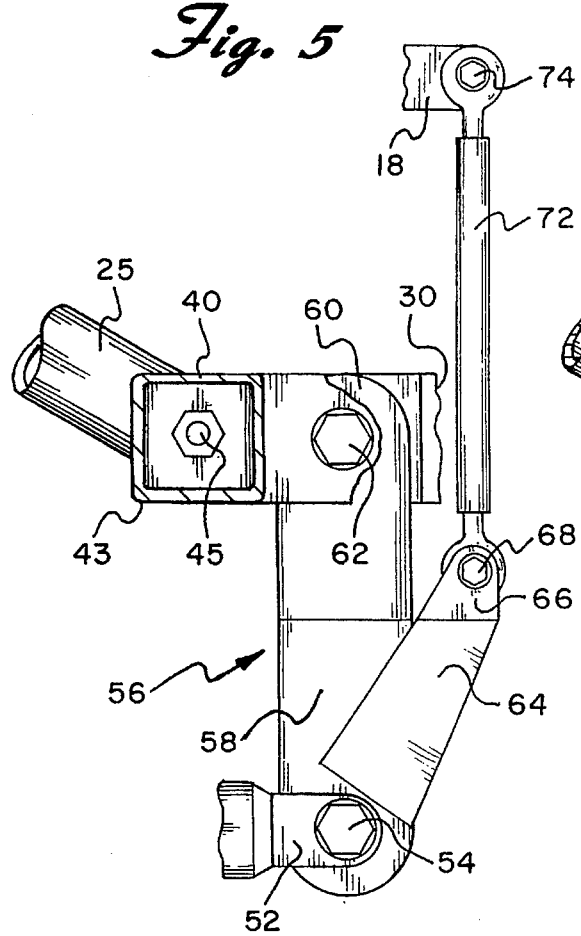
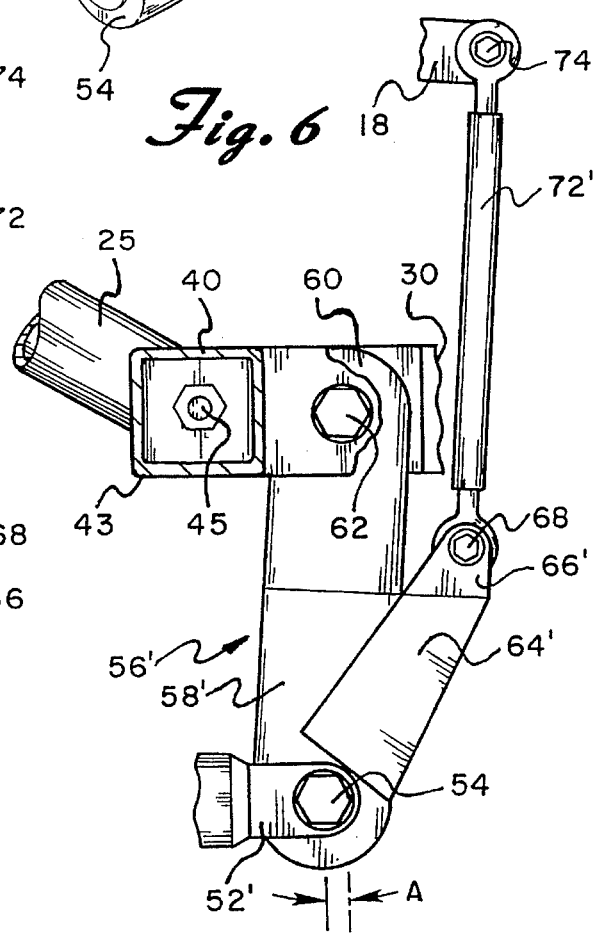

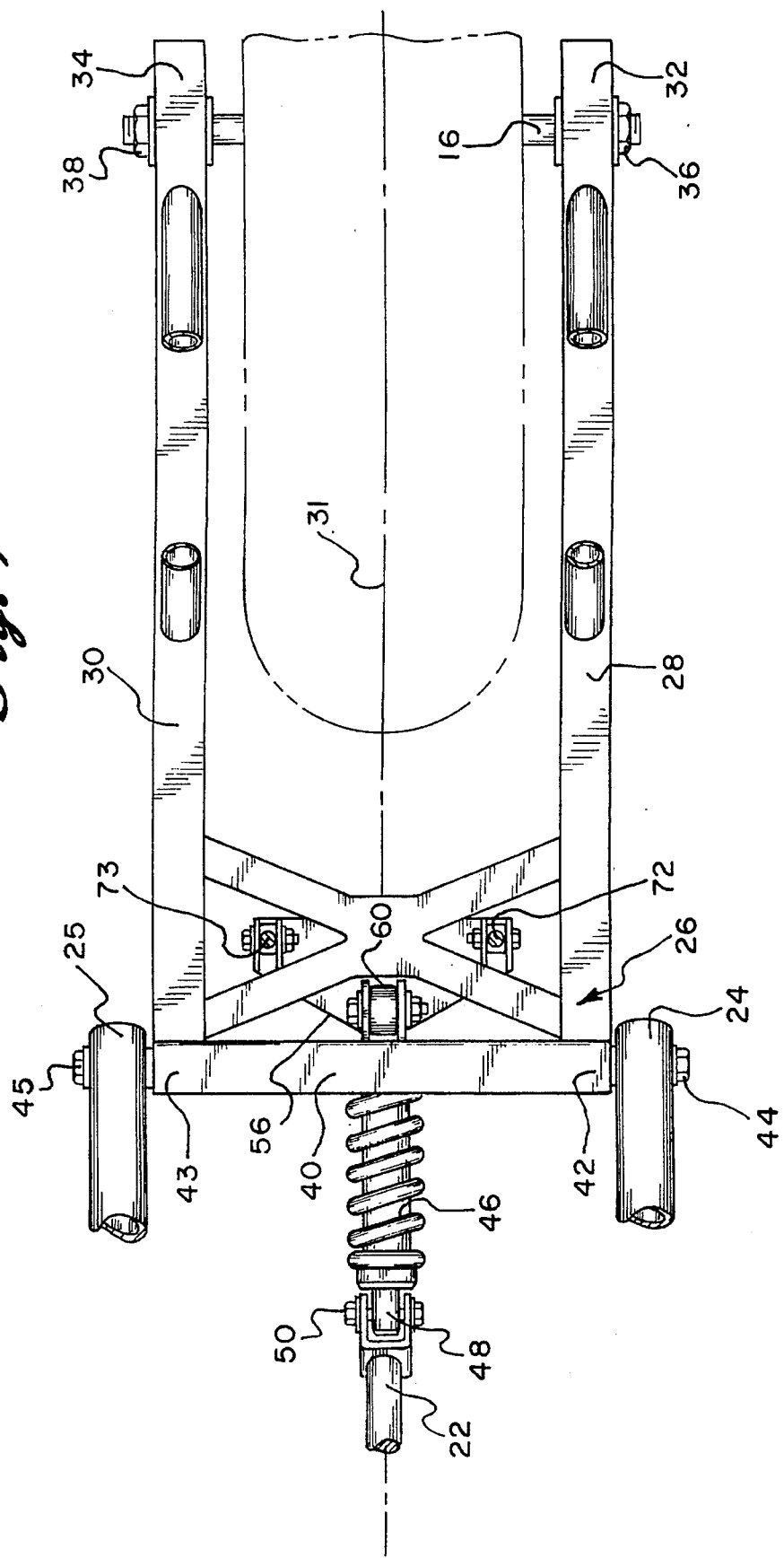

MOTOR VEHICLE AND SUSPENSION LINKAGE

BACKGROUND OF THE INVENTION

This invention is directed to a motor vehicle apparatus and a shock absorbing device for use thereon. More specially the invention is directed to a motorcycle or like vehicle and shock absorbing device for use thereon.

Most suspension mechanisms for motor vehicles and more particularly motorcycles utilize vertically mounted shock absorbers. The shock absorbers on motorcycles are generally located behind the motor at a location where they are substantially affected by heat build up due to the surroundings and that they are shielded from beneficial cooling air flow. Heat is a major cause of performance deterioration for shock absorbers. It is also desirable to have a "rising rate" shock absorbing system to provide a smooth ride coupled with protection from major bumps in the road. The rising rate system provides that a relatively large movement is required to move against the shock absorber resistance at the start while further movement due to a greater shock encounters a larger proportion of resistance for a smaller movement. Various linkage and shock absorbing mechanisms obstruct the mounting of storage bags of other containers on the sides of the rear tire. Using the present linkage systems it is not feasible to mount the shock absorbers at a lower height.

In U.S. Pat. No. 4,805,717 to Trema, assigned to Elf France, a bracket construction for a motorcycle assembly is disclosed that includes spring-shock-absorber block 12 supported by connecting rigging 11 on the rear end connected to draw bars or rods 11 which are connected through screws 14 and 15. In U.S. Pat. No. 4,347,909 to Takemura, assigned to Honda, a pivotal seat arrangement is disclosed as well as shock absorber 24 connected to hinge brackets 8 and 9 through hinge pin 10 on the rear through swingable link 23 which is connected through bifurcated link 22 to the rear frame. In U.S. Pat. No. 4,463,964 to Takayanagi et al., also assigned to Honda, a rear suspension is disclosed including damper 132 connected through a link arm 129 and tension rod 130 with movement as shown in the shadow view of FIG. 7. In U.S. Pat. No. 3,948,543 to Mac Donald et al., a motorcycle suspension is disclosed showing horizontally disposed spring 26. In U.S. Pat. No. 4,076,271 to Doncque and 4,418,800 to Hess, suspension systems with vertically disposed shock absorbers are shown. In U.S. Pat. No 4,781,264 to Matsuzaki et al., assigned to Honda, a horizontally disposed cushioning unit for a motorcycle is disclosed. The positioning of spring shock absorber 33 and the linkage is typical of commercially available units.

None of the above devices and systems satisfy the needs described herein above and attain the objects provided herein below.

SUMMARY OF INVENTION

It is an object of the present invention to provide a shock absorbing system for use on a motor vehicle which places a substantial amount of the linkage and the shock absorber itself at a lower height, thus lowering the center of gravity of the unit.

It is a further object of the present invention to provide a shock absorbing system which places the shock absorber in the direct air flow outside of and away from other portions of the vehicle to allow air cooling of the shock absorber during travel thereby reducing the tendency of the shock absorber to fade.

It is an additional object of the present invention to provide a shock absorbing mechanism that provides an improved shock control and improved ride in a rising rate system. It is an object to provide a system wherein there is significantly larger movement against a given absorbing resistance provided by the system for small bumps to provide a relatively easy ride, but to provide a substantially reduced movement against the increased absorbing resistance upon further movement of the shock absorber for large bumps.

It is a particular object of the present invention to provide a shock absorbing system that does not in any way obstruct the mounting of bags or containers on the sides of the rear wheel of a motorcycle.

It is an object of the present invention to provide a shock absorbing system that is compressed into a compact and efficient unit that does not in any way interfere with the operation of the motor vehicle.

It is a further object of the present invention to provide a shock absorbing system that, by relatively minor changes, allows for substantial adjustment of the rising rate, the ride height of the chassis, and the firmness of the ride.

An aspect of the invention is a shock absorbing apparatus for use on a motor vehicle including a horizontal axle on which a wheel rotates, and a frame having frame connection points positioned horizontal distances in a first direction from the horizontal axle. The connection points include at least one upper frame connection, a lower frame connection point, and at least one median frame connection point at a height between the upper frame connection points and the lower frame connection point. The device includes a swing arm member connected generally horizontally in the first direction from a rear end rigidly connected to the axle, the swing arm member including a front section terminating at a front end pivotal connection to a median frame connection point of the frame, said connection allowing the swing arm member to pivot in a vertical plane, and a median connection point on the front section of the swing arm member. The device further includes shock absorbing means to absorb hard sudden forces that includes a front end having a pivotal connection to the lower frame connection point of the frame, said connection allowing the shock absorbing means to pivot in a vertical plane, and a moveable piston member extending rearwardly toward the axle. The device also includes an integral linkage member that includes a generally vertically disposed section including an upper end pivotally connected at a connection to the median connection point on the front section of the swing arm member, and a lower end pivotally connected at a connection to a terminal end of the moveable piston member of the shock absorbing means, said connections allowing the integral linkage member and the shock absorbing means to pivot in a vertical plane. The integral linkage member further includes a rearwardly, upwardly angled section including at least one rear connection point positioned rearwardly of the vertically disposed section. The device further includes at least one anchor arm member, disposed generally vertically, including an upper end having a pivotal connection to an upper frame connection point of the frame, and a lower end having a pivotal connection to a rear connection point of the rearwardly, upwardly angled section of the integral linkage member. The said latter connections allow the integral linkage member and the anchor arm member to pivot in a vertical plane.

It is preferred that there be a horizontal distance between the front end pivotal connection on the swing arm member and the median connection point on the front section of the swing arm member of about one to three inches. It is more preferred that the said horizontal distance be about two inches. It is further preferred that there be a horizontal distance between the rear connection point of the rearwardly, upwardly angled section of the integral linkage member and the median connection point on the front section of the swing arm member of about one to three inches. It is more preferred that the said horizontal distance be about two inches. It is further preferred that the motor vehicle be a motorcycle wherein the frame also includes a central axis and two median connection points, the axle include two ends on opposite sides of the central axis, and the swing arm member be a "U" shaped member which includes two arm sections extending rearwardly on opposite sides of the central axis and terminating with two ends each rigidly connected to respective opposite ends of the rear axle, the front section including a base of the "U" shape pivotally connected at two connections to the median frame connection points of the frame, and the median connection point positioned rearwardly of the base of the "U" shape. It is also preferred that the motor vehicle be a motorcycle wherein the frame also includes a central axis and two upper connection points positioned horizontally on opposite sides of the central axis, and the device further includes two rear connection points on the rearwardly, upwardly angled section of the integral linkage member, said points on opposite sides of the central axis on a vertical plane positioned rearwardly of the vertically disposed section of the integral linkage member, and two one anchor arm members positioned on opposite sides of the central axis, each upper end having a pivotal connection to an upper connection point of the frame, and a lower end having a pivotal connection to a rear connection point of the rearwardly, upwardly angled section of the integral linkage member.

Another aspect of the invention is a motor vehicle apparatus including a horizontal axle on which a wheel rotates, and a frame having frame connection points positioned horizontal distances in a first direction from the horizontal axle. The connection points include at least one upper frame connection, a lower frame connection point, and at least one median frame connection point at a height between the upper frame connection points and the lower frame connection point. The apparatus includes a swing arm member connected generally horizontally in the first direction from a rear end rigidly connected to the axle, the swing arm member including a front section terminating at a front end pivotal connection to a median frame connection point of the frame, said connection allowing the swing arm member to pivot in a vertical plane, and a median connection point on the front section of the swing arm member. The apparatus further includes shock absorbing means to absorb hard sudden forces that includes a front end having a pivotal connection to the lower frame connection point of the frame, said connection allowing the shock absorbing means to pivot in a vertical plane, and a moveable piston member extending rearwardly toward the axle. The apparatus also includes an integral linkage member that includes a generally vertically disposed section comprising an upper end pivotally connected at a connection to the median connection point on the front section of the swing arm member, and a lower end pivotally connected at a connection to a terminal end of the moveable piston member of the shock absorbing means said connections allowing the integral linkage member and the shock absorbing means to pivot in a vertical plane. The integral linkage member includes a rearwardly, upwardly angled section comprising at least one rear connection point positioned rearwardly of the vertically disposed section. The apparatus further includes at least one anchor arm member, disposed generally vertically that includes an upper end having a pivotal connection to an upper frame connection point of the frame, and a lower end having a pivotal connection to a rear connection point of the rearwardly, upwardly angled section of the integral linkage member, wherein the said connections allow the integral linkage member and the anchor arm member to pivot in a vertical plane.

Yet another aspect of the invention is a shock absorbing device for use on a motorcycle including a central axis extending from a front to a rear of the motorcycle, a rear wheel horizontal axle with ends on opposite sides of the central axis, a frame having frame connection points all located in a median section of the central axis, said connection points comprising two upper frame connection points each spaced on opposite sides of the central axis, a lower median frame connection point, and two medial frame connection points, each spaced on opposite sides of the central axis, at a height between the upper frame connection points and the lower frame connection point. The device includes a swing arm "U" shaped member connected generally horizontally that includes two arm sections extending rearwardly on opposite sides of the central axis and terminating with two ends each rigidly connected to respective opposite ends of the rear axle, a front section including a base of the "U" shape pivotally connected at two connections to the medial frame connection points of the frame, said connections allowing the swing arm "U" shaped member to pivot in a vertical plane, and a median connection point positioned rearwardly of the base of the "U" shape. The device further includes shock absorbing means to absorb hard sudden forces that includes a front end pivotally connected to the lower frame connection point of the frame, said connection allowing the shock absorbing means to pivot in a vertical plane, and a moveable piston member extending rearwardly. The device also includes an integral linkage member comprising a generally vertically disposed section including an upper end pivotally connected at a connection to the median connection point on the swing arm member, and a lower end pivotally connected at a connection to a rear end of the moveable piston mender of the shock absorbing means, wherein the said connections allow the swing arm member and the shock absorbing means to pivot in a vertical plane The integral linkage member further includes a rearwardly, upwardly angled section including two rear connection points positioned rearwardly of the vertically disposed section and spaced apart from each other on opposite sides of the central axis. The device further includes two anchor arm members, each disposed generally vertically on opposite sides of the central axis and each including an upper end pivotally connected to a respective upper frame connection point of the frame, and a lower end pivotally connected to a respective rear connection point of the rearwardly, upwardly angled section of the integral linkage member, wherein the said connections allow the anchor arm members and the integral linkage member to pivot in a vertical planes.

A further aspect of the invention is a motorcycle apparatus comprising a central axis extending from a front to a rear of the apparatus, a rear wheel horizontal axle with ends on opposite sides of the central axis, a frame having frame connection points all located in a median section of the central axis, said connection points comprising two upper frame connection points each spaced on opposite sides of the central axis, a lower median frame connection point, and two medial frame connection points, each spaced on opposite sides of the central axis, at a height between the upper frame connection points and the lower frame connection point. The apparatus includes all the elements of the shock absorbing device for use on a motorcycle provided hereinabove.

BRIEF DESCRIPTION OF THE DRAWINGS

FIG. 1 is a side elevational view of a shock absorbing system of the present invention installed on a motorcycle.

FIG. 2 is a cross-sectional view taken along lines 2—2 of FIG. 1.

FIG. 3 is a front bottom, left side perspective view of an integral linkage member of the system illustrated in FIGS. 1 and 2.

FIG. 4 is a rear top, left side perspective view thereof.

FIG. 5 is an expanded partial cutaway elevational view of a section of the device illustrated in FIG. 1.

FIG. 6 is a similar view thereof showing movement upon the system receiving a substantial shock.

FIG. 7 is a partial cutaway cross-sectional view taken along lines 7—7 of FIG. 1.

DESCRIPTION OF PREFERRED EMBODIMENTS

As shown in FIG. 1, device 10 is shown installed on a motorcycle represented by frame section 12, connection points 18, 20 (hidden) 22, 24, and 25 (hidden) on the frame, and rear wheel 14 riding on rear axle 16. More specifically, the connection points include upper left side frame connection point 18 and the adjacent upper right side frame connection point 20, that is that is hidden in FIG. 1, and is located on the right side of a central axis running from the front of the motorcycle to rear axle 16. Additional connection points are lower frame connection point 22 and medial frame connection points 24 and 25. Left medial frame connection point 24 and right medial frame connection point 25 (hidden in FIG. 1) are both positioned at a height between that of the upper and lower connection points and are each positioned on opposite sides of the central axis as shown on FIG. 7. The system includes swing arm "U" shaped member 26 shown in FIGS. 1 and 7. Member 26 is constructed of one-eighth inch thick one inch by two inch box shaped steel tubing and includes left arm 28 extending rearwardly on the left side of central axis 31. Right arm 30, hidden in FIG. 1, extends rearwardly toward rear axle 16 on the right side of central axis 31. Arms 28 and 30 terminate at ends 32 and 34, respectively, and are rigidly connected at connection points 36 and 38, respectively, to rear axle 16. Front section 40 is the base of the "U" shape of member 26 and terminates at front left end corner 42 proximate pivot connection 44 pivotally connecting to left medial frame connection point 24 and at front right end corner 43 proximate pivot connection 45 pivotally connecting to the left medial frame connection point 25. Front end 48 of standard shock absorber 36 is pivotally connected to lower median frame connection point 22 at pivot connection 50. Shock absorber 46 is held horizontally with rear end 52 of the piston member of shock absorber 46 extending rearwardly. Integral linkage member 56 is fabricated of welded one eighth inch thick steel plate, but may be a steel casting as illustrated in FIGS. 3 and 4. Member 56 includes vertical section 58 with upper end 60 having pivot connection 62 to a median connection point of front section 40 of member 26. Pivot connection 54 is located at the lower end of vertical section 58 connecting with rear end 52 of the piston member of shock absorber 46. Rearwardly upwardly angled section 64 is part of the integral casting of member 56 and includes upper section 66 with left connection point 68 and right connection point 70, the latter hidden in FIG. 1. Connection points 68 and 70 are positioned respectively to the left and to right of central center axis 31. Anchor arm members 72 on the left and 73 on the right extend vertically upwardly from pivot connections to points 68 and 70 to upper pivot connections 74 and 76 connecting to left side and right side upper median frame connection points 18 and 20, respectively. The movement of device 10 is illustrated in FIGS. 5 and 6. The distance between a vertical plane through connection points 68 and 70 and connection point 62 is about two inches. Likewise, the horizontal distance between connection point 62 and a vertical plane extending through connection points 44 and 45 is also about two inches. As this latter distance is increased, leverage is reduced, reducing the distance of movement of piston end 52 with respect to movement of the axle. In this configuration a five and one-half inch movement of axle 16 translates to about 2 inch movement of arc A as illustrated in FIG. 6. Further frontward movement of connection point 62 reduces the movement of the piston and increases the leverage. Movement rearwardly reduces the leverage and increases the travel distance of the piston. As swing arm member 26 is raised to position 26' due to impact against the rear tire and axle 16, member 56 is tilted such the lower end swings frontwardly to position 56', driving connection point 54 against piston end 52' of shock absorber 46. Pivot connection 54 swings in arc A in response to movement of member 26' controlled by offset connections 68 and 60 connected to the frame by anchor arms 72 and 73.

Swing arm 26 may be single straight member extending along only one side of the wheel to the axle and may extend rearwardly to the axle as shown or may extend frontwardly and connect to the axle from a rearward position. Where arm 26 is a straight member, there is only one medial connection to the frame. Further when there is only one rear connection point on rearwardly upwardly angled section 64 of the integral member 56, there is only one anchor arm member, such as 72.

While this invention has been described with reference to specific embodiments disclosed herein, it is not confined to the details set forth and the patent is intended to include modifications and changes which may come within and extend from the following claims.

I claim:

1. A shock absorbing apparatus for use on a motor vehicle comprising a horizontal axle on which a wheel rotates, and a frame having frame connection points positioned horizontal distances in a first direction from the horizontal axle, the connection points comprising at least one upper frame connection, a lower frame connection point, and at least one median frame connection point at a height between the upper frame connection points and the lower frame connection point, the device comprising:

(a) a swing arm member connected generally horizontally in the first direction from a rear end rigidly connected to the axle, the swing arm member comprising a front section terminating at a front end pivotal connection to the median frame connection point of the frame, said connection allowing the swing arm member to pivot in a vertical plane, and a median connection point on the front section of the swing arm member, (b) shock absorbing means to absorb hard sudden forces comprising:

(i) a front end having a pivotal connection to the lower frame connection point of the frame, said connection allowing the shock absorbing means to pivot in a vertical plane, and (ii) a moveable piston member extending rearwardly toward the axle, (c) an integral linkage member comprising:
  (i) a generally vertically disposed section comprising an upper end pivotally connected at a connection to the median connection point on the front section of the swing arm member, and a lower end pivotally connected at a connection to a terminal end of the moveable piston member of the shock absorbing means, said connections allowing the integral linkage member and the shock absorbing means to pivot in a vertical plane, and
  (ii) a rearwardly, upwardly angled section comprising at least one rear connection point positioned rearwardly of the vertically disposed section, and (d) at least one anchor arm member, disposed generally vertically, comprising:
  (i) an upper end having a pivotal connection to an upper frame connection point of the frame, and
  (ii) a lower end having a pivotal connection to a rear connection point of the rearwardly, upwardly angled section of the integral linkage member,
  wherein the said connections of the anchor arm member allow the integral linkage member and the anchor arm member to pivot in a vertical plane.

2. The device of claim 1 wherein a horizontal distance between the front end pivotal connection on the swing arm member and the median connection point on the front section of the swing arm member is about one to three inches.

3. The device of claim 2 wherein the horizontal distance is about two inches.

4. The device of claim 1 wherein a horizontal distance between the rear connection point of the rearwardly, upwardly angled section of the integral linkage member and the median connection point on the front section of the swing arm member is about one to three inches.

5. The device of claim 4 wherein the horizontal distance is about two inches.

6. The device of claim 1 wherein the motor vehicle is a motorcycle wherein the frame also comprises a central axis and two median connection points, the axle comprises two ends on opposite sides of the central axis, and the swing arm member is a "U" shaped member comprising:
  (i) two arm sections extending rearwardly on opposite sides of the central axis and terminating with two ends each rigidly connected to respective opposite ends of the rear axle,
  (ii) the front section comprising a base of the "U" shape pivotally connected at two connections to the at least one median frame connection point of the frame, and
  (iii) the median connection point positioned rearwardly of the base of the "U" shape.

7. The device of claim 1 wherein the motor vehicle is a motorcycle wherein the frame also comprises a central axis and the at least one upper frame connection comprises two upper connection points positioned horizontally on opposite sides of the central axis, and the motorcycle further comprises:
  (i) two rear connection points on the rearwardly, upwardly angled section of the integral linkage member, said points on opposite sides of the central axis on a vertical plane positioned rearwardly of the vertically disposed section of the integral linkage member, and
  (ii) two anchor arm members positioned on opposite sides of the central axis, each upper end having a pivotal connection to an upper connection point of the frame, and a lower end having a pivotal connection to a rear connection point of the rearwardly, upwardly angled section of the integral linkage member.

8. A motor vehicle apparatus comprising a horizontal axle on which a wheel rotates, and a frame having frame connection points positioned horizontal distances in a first direction from the horizontal axle, the connection points comprising at least one upper frame connection, a lower frame connection point, and at least one median frame connection point at a height between the upper frame connection points and the lower frame connection point, the apparatus comprising:

(a) a swing arm member connected generally horizontally in the first direction from a rear end rigidly connected to the axle, the swing arm member comprising a front section terminating at a front end pivotal connection to the median frame connection point of the frame, said connection allowing the swing arm member to pivot in a vertical plane, and a median connection point on the front section of the swing arm member, (b) shock absorbing means to absorb hard sudden forces comprising:
  (i) a front end having a pivotal connection to the lower frame connection point of the frame, said connection allowing the shock absorbing means to pivot in a vertical plane, and
  (ii) a moveable piston member extending rearwardly toward the axle, (c) an integral linkage member comprising:
  (i) a generally vertically disposed section comprising an upper end pivotally connected at a connection to the median connection point on the front section of the swing arm member, and a lower end pivotally connected at a connection to a terminal end of the moveable piston member of the shock absorbing means, said connections allowing the integral linkage member and the shock absorbing means to pivot in a vertical plane, and
  (ii) a rearwardly, upwardly angled section comprising at least one rear connection point positioned rearwardly of the vertically disposed section, and (d) at least one anchor arm member, disposed generally vertically, comprising:
  (i) an upper end having a pivotal connection to an upper frame connection point of the frame, and
  (ii) a lower end having a pivotal connection to a rear connection point of the rearwardly, upwardly angled section of the integral linkage member,
  wherein the said connections of the anchor arm member allow the integral linkage member and the anchor arm member to pivot in a vertical plane.

9. The apparatus of claim 8 wherein a horizontal distance between the front end pivotal connection on the swing arm member and the median connection point on the front section of the swing arm member is about one to three inches.

10. The apparatus of claim 8 wherein a horizontal distance between the rear connection point of the rearwardly, upwardly angled section of the integral linkage member and the median connection point on the front section of the swing arm member is about one to three inches.

11. The apparatus of claim 8 is a motorcycle wherein the frame also comprises a central axis and two median connection points, the axle comprises two ends on opposite sides of the central axis, and the swing arm member is a "U" shaped member comprising:
- (i) two arm sections extending rearwardly on opposite sides of the central axis and terminating with two ends each rigidly connected to respective opposite ends of the rear axle,
- (ii) the front section comprising a base of the "U" shape pivotally connected at two connections to the at least one median frame connection point of the frame, and
- (iii) the median connection point positioned rearwardly of the base of the "U" shape.

12. The apparatus of claim 8 is a motorcycle wherein the frame also comprises a central axis and the at least one upper frame connection comprises two upper connection points positioned horizontally on opposite sides of the central axis, and the motorcycle further comprises:
- (i) two rear connection points on the rearwardly, upwardly angled section of the integral linkage member, said points on opposite sides of the central axis on a vertical plane positioned rearwardly of the vertically disposed section of the integral linkage member, and
- (ii) two anchor arm members positioned on opposite sides of the central axis, each upper end having a pivotal connection to an upper connection point of the frame, and a lower end having a pivotal connection to a rear connection point of the rearwardly, upwardly angled section of the integral linkage member.

13. A shock absorbing device for use on a motorcycle comprising a central axis extending from a front to a rear of the motorcycle, a rear wheel horizontal axle with ends on opposite sides of the central axis, a frame having frame connection points all located in a median section of the central axis, said connection points comprising two upper frame connection points each spaced on opposite sides of the central axis, a lower median frame connection point, and two medial frame connection points, each spaced on opposite sides of the central axis, at a height between the upper frame connection points and the lower frame connection point, the device comprising:
- (a) a swing arm "U" shaped member connected generally horizontally comprising:
  - (i) two arm sections extending rearwardly on opposite sides of the central axis and terminating with two ends each rigidly connected to respective opposite ends of the rear axle,
  - (ii) a front section comprising a base of the "U" shape pivotally connected at two connections to the medial frame connection points of the frame, said connections allowing the swing arm "U" shaped member to pivot in a vertical plane, and
  - (iii) a median connection point positioned rearwardly of the base of the "U" shape,
- (b) shock absorbing means to absorb hard sudden forces comprising:
  - (i) a front end having a pivotal connection to the lower frame connection point of the frame, said connection allowing the shock absorbing means to pivot in a vertical plane, and
  - (ii) a moveable piston member extending rearwardly,
- (c) an integral linkage member comprising:
  - (i) a generally vertically disposed section comprising an upper end pivotally connected at a connection to the median connection point on the swing arm member, and a lower end pivotally connected at a connection to a rear end of the moveable piston member of the shock absorbing means, wherein the said connections allow the swing arm member and the shock absorbing means to pivot in a vertical plane, and
  - (ii) a rearwardly, upwardly angled section comprising two rear connection points positioned rearwardly of the vertically disposed section and spaced apart from each other on opposite sides of the central axis, and
- (d) two anchor arm members, each disposed generally vertically on opposite sides of the central axis and each comprising:
  - (i) an upper end pivotally connected to a respective upper frame connection point of the frame, and
  - (ii) a lower end pivotally connected to a respective rear connection point of the rearwardly, upwardly angled section of the integral linkage member, wherein the said connections of the anchor arm member allowing the anchor arm members and the integral linkage member to pivot in vertical planes.

14. The device of claim 13 wherein the two rear connections of the rearwardly, upwardly angled section of the integral linkage member are on a plane positioned rearwardly of a line drawn between the connections at the upper end and the lower end of the generally vertically disposed section of the integral linkage member.

15. The device of claim 14 wherein the horizontal distance between said plane and said line is about one to about three inches.

16. The device of claim 13 wherein a horizontal distance between a line drawn between the connections on the front section of the swing arm member and the median connection point on the swing arm member is about one to three inches.

17. The device of claim 15 wherein a horizontal distance between a line drawn between the connections on the front section of the swing arm member and the median connection point on the swing arm member is about one to three inches.

18. A motorcycle apparatus comprising a central axis extending from a front to a rear of the apparatus, a rear wheel horizontal axle with ends on opposite sides of the central axis, a frame having frame connection points all located in a median section of the central axis, said connection points comprising two upper frame connection points each spaced on opposite sides of the central axis, a lower median frame connection point, and two medial frame connection points, each spaced on opposite sides of the central axis, at a height between the upper frame connection points and the lower frame connection point, the apparatus comprising:
- (a) a swing arm "U" shaped member connected generally horizontally comprising:
  - (i) two arm sections extending rearwardly on opposite sides of the central axis and terminating with two ends each rigidly connected to respective opposite ends of the rear axle,
  - (ii) the front section comprising a base of the "U" shape pivotally connected at two connections to the medial frame connection points of the frame, said connections allowing the swing arm "U" shaped member to pivot in a vertical plane, and
  - (iii) the median connection point positioned rearwardly of the base of the "U" shape,
- (b) shock absorbing means to absorb hard sudden forces comprising:
  - (i) a front end having a pivotal connection to the lower frame connection point of the frame, said connection allowing the shock absorbing means to pivot in a vertical plane, and
  - (ii) a moveable piston member extending rearwardly,
- (c) an integral linkage member comprising:
  - (i) a generally vertically disposed section comprising an upper end pivotally connected at a connection to the median connection point on the swing arm member, and a lower end pivotally connected at a connection to a rear end of the moveable piston member of the shock absorbing means, wherein the said connections allow the swing arm member and the shock absorbing means to pivot in a vertical plane, and (ii) a rearwardly, upwardly angled section comprising two rear connection points positioned rearwardly of the vertically disposed section and spaced apart from each other on opposite sides of the central axis, and (d) two anchor arm members, each disposed generally vertically on opposite sides of the central axis and each comprising:

(i) an upper end pivotally connected to a respective upper frame connection point of the frame, and (ii) a lower end pivotally connected to a respective rear connection point of the rearwardly, upwardly angled section of the integral linkage member, wherein the said connections of the anchor arm members allowing the anchor arm members and the integral linkage member to pivot in vertical planes.

19. The apparatus of claim 18 wherein the two rear connections of the rearwardly, upwardly angled section of the integral linkage member are on a plane positioned rearwardly of a line drawn between the connections at the upper end and the lower end of the generally vertically disposed section of the integral linkage member.

20. The apparatus of claim 19 wherein the horizontal distance between said plane and said line is about one to about three inches.

21. The apparatus of claim 18 wherein a horizontal distance between a line drawn between the connections on the front section of the swing arm member and the median connection point on the swing arm member is about one to three inches.

22. The apparatus of claim 20 wherein a horizontal distance between a line drawn between the connections on the front section the swing arm member and the median connection point on the swing arm member is about one to three inches.

\* \* \* \* \*